(12) United States Patent
Shimizu et al.

(10) Patent No.: US 10,522,865 B2
(45) Date of Patent: Dec. 31, 2019

(54) FUEL CELL STACK

(71) Applicants: TOYOTA JIDOSHA KABUSHIKI KAISHA, Toyota-shi, Aichi-ken (JP); TOYODA GOSEI CO., LTD., Kiyosu-shi, Aichi-ken (JP)

(72) Inventors: Tatsuhiko Shimizu, Toyota (JP); Hitoshi Hamada, Gotenba (JP); Tadanobu Ota, Kiyosu (JP); Yoshiki Nakamura, Kiyosu (JP)

(73) Assignees: Toyota Jidosha Kabushiki Kaisha, Toyota-shi, Aichi-ken (JP); Toyoda Gosei Co., Ltd., Kiyosu-shi, Aichi-ken (JP)

( * ) Notice: Subject to any disclaimer, the term of this patent is extended or adjusted under 35 U.S.C. 154(b) by 251 days.

(21) Appl. No.: 15/789,168

(22) Filed: Oct. 20, 2017

(65) Prior Publication Data
US 2018/0123158 A1    May 3, 2018

(30) Foreign Application Priority Data

Oct. 27, 2016    (JP) .................................. 2016-210639

(51) Int. Cl.
*H01M 8/2475* (2016.01)
*H01M 8/2483* (2016.01)
(Continued)

(52) U.S. Cl.
CPC ....... *H01M 8/2475* (2013.01); *H01M 8/0276* (2013.01); *H01M 8/241* (2013.01);
(Continued)

(58) Field of Classification Search
CPC .......................... H01M 8/2475; H01M 8/2483
See application file for complete search history.

(56) References Cited

U.S. PATENT DOCUMENTS

| 6,372,373 | B1 * | 4/2002 | Gyoten | ............... | H01M 8/0254 |
| | | | | | 429/461 |
| 6,531,236 | B1 * | 3/2003 | Hatoh | ................. | H01M 8/2483 |
| | | | | | 429/454 |

(Continued)

FOREIGN PATENT DOCUMENTS

| JP | 4824297 | 11/2011 |
| JP | 2015-8086 | 1/2015 |

OTHER PUBLICATIONS

U.S. Appl. No. 15/657,629, "Fuel Cell Stack," filed Jul. 24, 2017.

*Primary Examiner* — Matthew J Merkling
(74) *Attorney, Agent, or Firm* — Finnegan, Henderson, Farabow, Garrett & Dunner, LLP

(57) ABSTRACT

A fuel cell stack includes a stack; a case that accommodates the stack; and end plates arranged in the outside of a stacking direction and formed with fluid flow path holes penetrating in the stacking direction an accommodating groove for accommodating a seal member for sealing a part between the accommodating groove and the case. The end plates have a metal member formed with the fluid flow path holes, a first recess and a second recess that continues to the first recess, and a resin layer that continuously covers an inner peripheral wall surface of the fluid flow path holes, a surface that faces the stack, a part that includes at least an outer peripheral side end in the first recess, and the second recess, in the metal member. The resin layer is formed with the accommodating groove in a surface corresponding to the end surface of the case in a part covering the part that includes at least the outer peripheral side end in the first recess. The second recess accommodates a part of the resin layer to restrict the resin layer.

6 Claims, 9 Drawing Sheets

(51) Int. Cl.
    *H01M 8/241*    (2016.01)
    *H01M 8/0276*   (2016.01)
    *H01M 8/1018*   (2016.01)
    *H01M 8/0284*   (2016.01)
(52) U.S. Cl.
    CPC ........ H01M 8/2483 (2016.02); *H01M 8/0284* (2013.01); *H01M 2008/1095* (2013.01)

(56) References Cited

U.S. PATENT DOCUMENTS

| | | | |
|---|---|---|---|
| 2010/0227246 A1* | 9/2010 | Iizuka | H01M 8/0228 |
| | | | 429/479 |
| 2011/0300460 A1* | 12/2011 | Barnard | H01M 8/04014 |
| | | | 429/427 |
| 2012/0009506 A1* | 1/2012 | Tanahashi | H01M 8/0273 |
| | | | 429/535 |
| 2014/0377679 A1* | 12/2014 | Yamamoto | H01M 8/006 |
| | | | 429/454 |
| 2016/0126563 A1* | 5/2016 | Hotta | H01M 8/0202 |
| | | | 429/468 |
| 2016/0141662 A1* | 5/2016 | Takeyama | H01M 8/04201 |
| | | | 429/444 |
| 2016/0344043 A1* | 11/2016 | Ichioka | H01M 8/2465 |
| 2018/0034091 A1* | 2/2018 | Shimizu | H01M 8/2483 |
| 2018/0047995 A1* | 2/2018 | Shimizu | H01M 8/02 |
| 2018/0287183 A1* | 10/2018 | Yamaura | H01M 8/0273 |
| 2018/0309151 A1* | 10/2018 | Yamaura | H01M 8/2484 |

* cited by examiner

THIRD EMBODIMENT

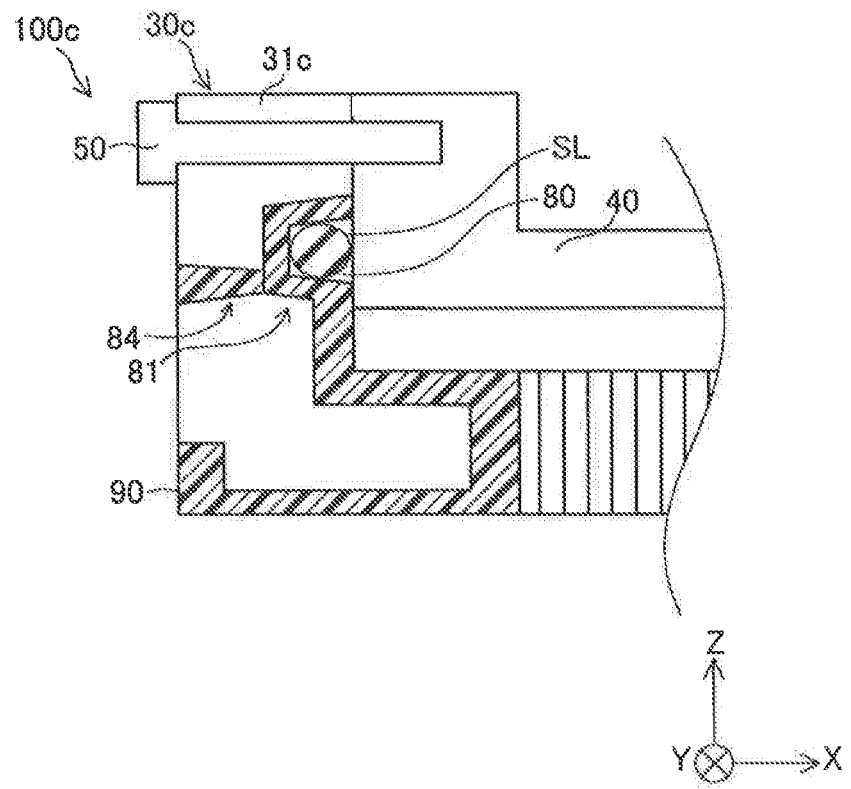

FUEL CELL STACK

CROSS-REFERENCE TO RELATED APPLICATIONS

The present application claims priority to Japanese Patent Application No. 2016-210639, filed Oct. 27, 2016, the disclosure of which is incorporated by reference herein in its entirety.

BACKGROUND

Field

The present disclosure relates to a fuel cell stack.

Related Art

In the inside of a fuel cell stack having a configuration in which both ends in a stacking direction of a stack of a plurality of unit cells are held between a pair of terminals and a pair of end plates, a plurality of manifolds are formed in parallel to the stacking direction, for supplying reactant gas to the unit cells, discharging off-gas from the unit cells, and supplying and discharging a cooling medium to the unit cells. At least one of the end plates is formed with a plurality of through holes for communicating with the manifolds in the fuel cell stack. Generally, the end plates are formed of metal such as aluminum alloy. Thus, a technique has been suggested, of covering a contact surface between the end plates and the terminals and inner peripheral walls of the through holes formed in the end plates, respectively, by a resin layer in order to prevent the insulation property and the anticorrosion property from decreasing due to the reactant gas, the cooling medium, or the like (see Japanese Patent Application Publication No. 2015-8086).

The fuel cell stack may have a configuration of accommodating the stack of the unit cells in a case. In this case, an end surface of the entire case and an end surface of the stack accommodated in the case are covered with the end plates and a periphery of an outer edge of the case and the end plates are fastened by a bolt or the like. At this time, a seal member such as a gasket is arranged between contact surfaces of the end plates and the case for securing air tightness and water tightness of the contact surfaces of the end plates and the case. For example, the seal member is accommodated in an accommodating groove provided in the end plates.

However, there is a problem that a clearance is generated between the resin layer and a metal member forming the end plates, the reactant gas and the cooling medium enter the clearance, and the insulation property and the anticorrosion property decrease. The clearance may be generated by, for example, repetition of application of a stress due to difference of coefficients of thermal expansion between the resin layer and the metal member to the resin layer caused by repetition of operation and stop of a fuel cell. In another case, for example, when the resin layer forms a configuration of covering an inner surface of the accommodating groove by resin molding, the clearance may be generated by separation of the resin layer from the accommodating groove of the metal member in contraction of the resin layer. Thus, a technique capable of preventing the resin layer from peeling off from the metal member in the end plates is desired.

SUMMARY

According to an embodiment of the present disclosure, a fuel cell stack is provided. The fuel cell stack includes: a stack that includes a plurality of stacked unit cells; a case that accommodates the stack; and an end plate that is arranged in the outside of a stacking direction of the plurality of unit cells with respect to the stack and is formed with fluid flow path holes penetrating in the stacking direction and an accommodating groove accommodating a seal member for sealing a part between the accommodating groove and the case. The end plates cover an end surface in the stacking direction of the stack and an end surface in the stacking direction of the case and are fastened to the end surface of the case. The end plates have a metal member formed with the fluid flow path holes, a first recess and a second recess that continues to the first recess, and a resin layer that continuously covers inner peripheral wall surfaces of the fluid flow path holes, a surface that faces the stack, a part that includes at least an outer peripheral side end in the first recess, and the second recess, in the metal member. The resin layer is formed with the accommodating groove in a surface corresponding to the end surface of the case in a part covering the part that includes at least the outer peripheral side end in the first recess. The second recess accommodates a part of the resin layer to restrict the resin layer.

BRIEF DESCRIPTION OF DRAWINGS

FIG. 9 is an enlarged cross-sectional view showing a configuration of a first end plate in a fuel cell stack as a fourth embodiment.

DESCRIPTION OF EMBODIMENTS

A. First Embodiment

A1. Configuration of Fuel Cell Stack

Figure 1:
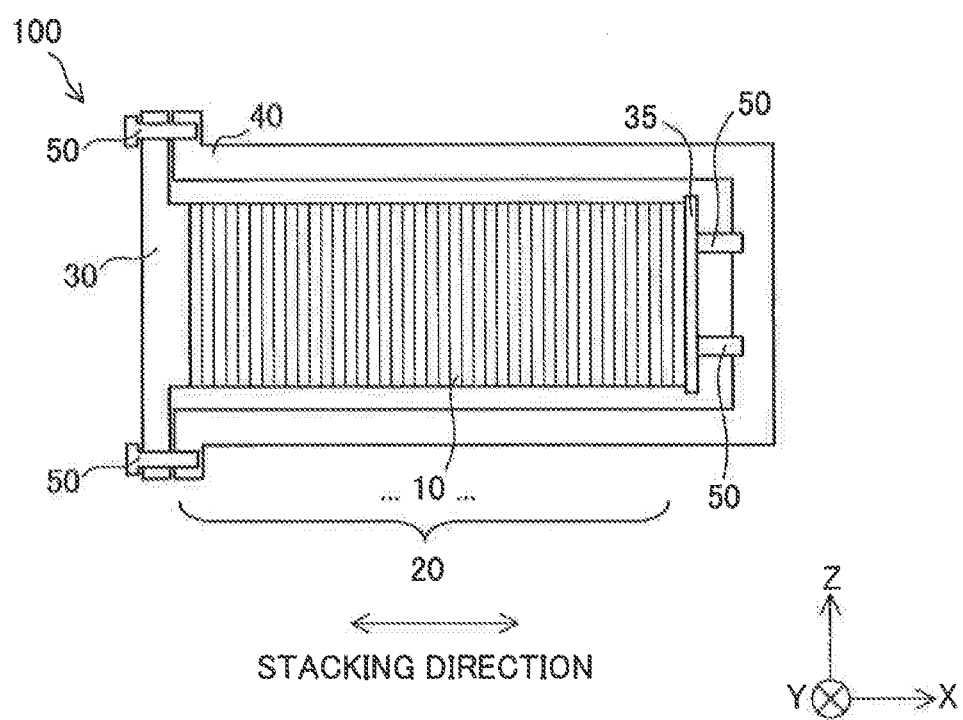
FIG. 1 is a cross-sectional view showing a schematic configuration of a fuel cell stack according to an embodiment of the present invention.

FIG. 1 is a cross-sectional view showing a schematic configuration of a fuel cell stack in an embodiment of the present invention. FIG. 1 shows a cross section along a stacking direction of a fuel cell stack 100. In FIG. 1, a Z-axis is set in parallel with a vertical direction and an X-axis and a Y-axis are set respectively in parallel with a horizontal direction. A +Z direction corresponds to vertical upward and a −Z direction corresponds to vertical downward. The stacking direction is parallel with the X-axis. The X-axis, Y-axis, and Z-axis in FIG. 1 correspond to the X-axis, Y-axis, and Z-axis in other drawings.

The fuel cell stack 100 includes a stack 20, a first end plate 30, a second end plate 35, a case 40, and a plurality of bolts 50. The stack 20 is configured so as to include a plurality of unit cells 10 stacked along the stacking direction. Particularly, the stack 20 includes the plurality of unit cells 10, a pair of terminal plates not shown, and a pair of insulators not shown. Each of the unit cells 10 is a solid polymer fuel cell and generates electrical power by electrochemical reaction using reactant gas supplied to an anode-side catalyst electrode layer and a cathode-side catalyst electrode layer that are provided so as to hold a solid polymer electrolyte membrane therebetween. The outside of each of the catalyst electrode layers of the electrodes in the unit cells 10 is arranged with, for example, a gas diffusion layer formed of a carbon porous body such as a carbon paper, and a carbon cloth. The outside of each of the gas diffusion layers of the electrodes, a separator having conductivity is arranged. The inside of the fuel cell stack 100 is formed with a plurality of manifolds in parallel with the stacking direction, for supplying the reactant gas to the unit cells 10, discharging off-gas from the unit cells 10, and supplying and discharging a cooling medium to and from the unit cells 10.

The first end plate 30 is located at the outside (−X direction) in the stacking direction with respect to one end surface (end surface of −X direction) of two end surfaces in the stacking direction of the stack 20. More particularly, a terminal plate not shown is arranged in contact with the end surface in −X direction side of the unit cell 10 that is an end in the −X direction. The first end plate 30 is arranged in the outside (−X direction) in the stacking direction interposing an insulator not shown between itself and the terminal plate.

The first end plate 30 includes a plate-like metal member (metal member 31 described later), and a resin layer (resin layer 90 described later). The shape of the first end plate 30 in a plan view (a shape when viewed in the +X direction) is a substantially rectangular shape. The area of the shape is larger than the area of the end surface along the stacking direction of the stack 20 in a plan view. The first end plate 30 sandwich with a second end plate (the second end plate 35 described later) the stack 20 in a predetermined pressure. The first end plate 30 and a ease (case 40 described later) are fastened by the bolts 50 to maintain the stacking state of the stack 20. The first end plate 30 is formed with a plurality of through holes penetrating in a thickness direction (X-axis direction). The plurality of through holes function as fluid flow path holes communicating with the plurality of manifolds formed in the inside of the stack 20. Particularly, the through holes function as supply flow path holes of the reactant gas and the cooling medium to the stack 20, and discharge flow path holes of the off-gas and the cooling medium from the stack 20. The first end plate 30 is formed with a plurality of recesses (first recess 81 and second recess 82 described later) in the +X direction of the first end plate 30.

The second end plate 35 is located in the outside (+X direction) of the stacking direction with respect to the end surface in the opposite side (+X direction) from the side arranged with the first end plate 30, of the two end surfaces of the stacking direction of the stack 20. Similar to the first end plate 30 described above, a terminal plate is arranged in contact with the end surface of the +X direction of the unit cell 10 that is an end in the +X direction. The second end plate 35 is arranged in the outside (+X direction) of the stacking direction interposing an insulator between itself and the terminal plate. The second end plate 35 has a plate-like appearance shape that is similar to the first end plate 30 and is formed of a metal member formed by an aluminum alloy in the present embodiment. The second end plate 35 is smaller than the first end plate 30, when viewed in the X-axis direction.

The case 40 has an appearance shape of a bottomed cylindrical shape in which an end in the −X direction is formed with an opening and the end in the opposite side (+X direction side) is closed. In the inside of the case 40, the stack 20 and the second end plate 35 are accommodated. As shown in the drawing, the first end plate 30 is arranged so that the end surface in the +X direction of the first end plate 30 covers the end surface in the −X direction of the stack 20 and the end surface in the −X direction of the case 40, and is fastened with the periphery of the outer edge of the case 40 by the bolts 50. The case 40 is excellent in waterproof performance, dust resistance, and shock resistance and is formed of an aluminum alloy in the present embodiment.

A2. Detailed Configuration of First End Plate 30

Figure 2:
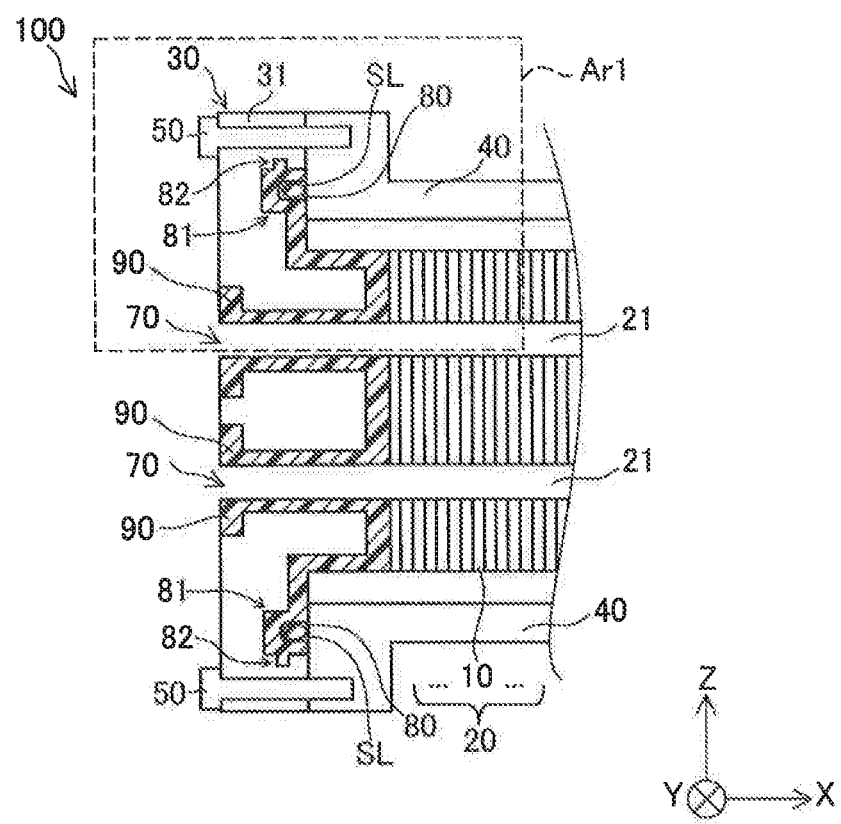
FIG. 2 is an enlarged cross-sectional view showing a configuration of a first end plate.
Figure 3:
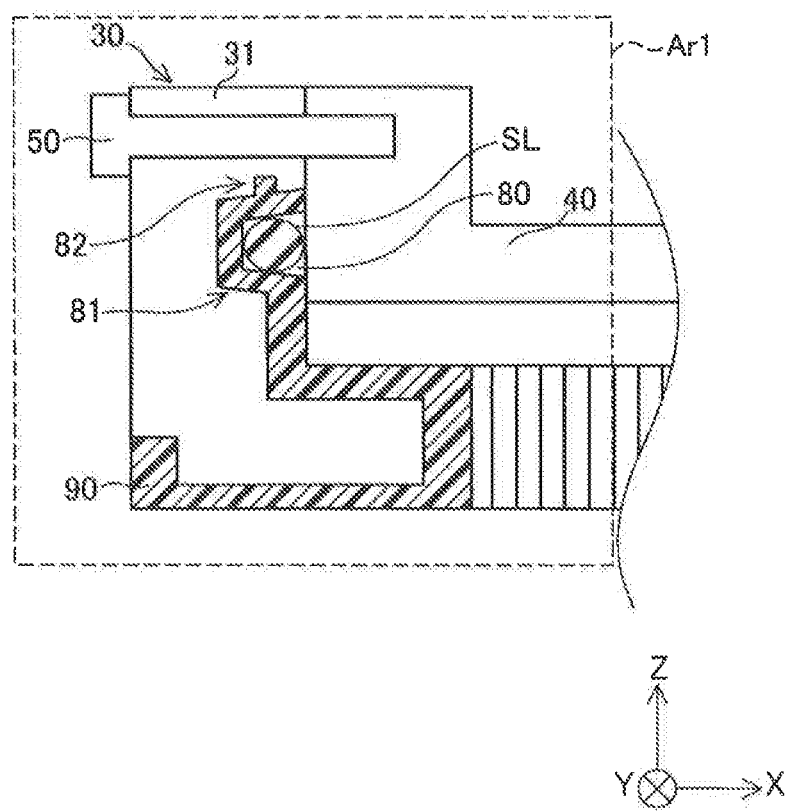
FIG. 3 is an enlarged cross-sectional view showing a region shown in FIG. 2.

FIG. 2 is an enlarged cross-sectional view showing the configuration of the first end plate 30. FIG. 3 is an enlarged cross-sectional view showing a region Ar1 shown in FIG. 2. The region Ar1 is a region including the end in the +Z direction of the first end plate 30. FIG. 2 enlarges and shows the configuration of the −X direction end side of the fuel cell stack 100 shown in FIG. 1. As shown in FIG. 2, the first end plate 30 includes a metal member 31 and a resin layer 90.

The metal member 31 is formed of a metal plate-like member. In the present embodiment, the metal member 31 is formed of an aluminum alloy. Instead of the aluminum alloy, the metal member 31 may be formed of an arbitrary metal such as titanium alloy and stainless steel. The metal member 31 is formed with fluid flow path holes 70, a first recess 81, and a second recess 82.

As shown in FIG. 2, the fluid flow path holes 70 are through holes formed along the thickness direction (X-axis direction) of the first end plate 30. As described above, the fluid flow path holes 70 communicate with manifolds 21 formed in the stack 20 and are used as flow paths of the cooling medium. In a cross section of the first end plate 30 in a different position from that in FIG. 2, instead of the manifolds 21, supply flow paths of the reactant gas or the discharge flow paths of the off-gas appears.

As shown in FIG. 2 and FIG. 3, the first recess 81 and the second recess 82 accommodate a part of the resin layer 90. The first recess 81 is formed in a ring-shape in the periphery of an outer edge of the case 40 in a surface of the first end plate 30 of two surfaces facing to each other of the first end plate 30 and the case 40 when the surface in the +X direction of the first end plate 30 and the surface in the −X direction of the case 40 are fastened. The first recess 81 is a recess that opens toward the case 40 (in other words, opens in the +X direction) and has the −X direction as a depth direction.

The second recess 82 continues to the first recess 81 in an outer peripheral surface (outer peripheral surface of the +Z direction in FIG. 3) of the first recess 81. The second recess 82 opens toward an inner peripheral side (−Z direction in FIG. 3) of the first recess 81 and has an outer peripheral direction of the first recess 81 as a depth direction. Inner surfaces of the first recess 81 and the second recess 82 are covered by the resin layer 90. The second recess 82 accommodates a part of the resin layer 90 to restrict the resin layer 90. In the present embodiment, "restrict" means preventing a movement.

The resin layer 90 is formed on a surface near the fluid flow path holes 70 in the metal member 31, and is used to prevent the cooling medium from leaking from the fluid flow path holes 70. The resin layer 90 is used to prevent the insulation property and the anticorrosion property from decreasing due to the cooling medium. The resin layer 90 is formed with an accommodating groove 80.

The accommodating groove 80 is a groove for accommodating a seal member SL. The accommodating groove 80 is formed in a surface corresponding to an end surface in the −X direction of the case 40 in a part covering the first recess 81 in the resin layer 90.

The seal member SL accommodated in the accommodating groove 80 is used to seal a contact surfaces of the first end plate 30 and the case 40. The seal member SL receives a fastening load in fastening of the fuel cell stack 100 and seals a part between the first end plate 30 and the case 40 by a surface pressure of the seal member SL. Thereby, air tightness and water tightness of the fuel cell stack 100 can be secured. In the present embodiment, the seal member SL is formed of a rubber. As the rubber, for example, a butyl rubber or a silicon rubber may be adopted.

The resin layer 90 is formed so as to continuously cover four regions described below. That is, first, the resin layer 90 is formed so as to cover the inner peripheral wall surfaces of the fluid flow path holes 70 in the metal member 31. Second, the resin layer 90 is formed so as to cover a surface facing a surface in the −X direction of the stack 20 in the metal member 31. Third, the resin layer 90 is formed so as to cover a part (an end in the +Z direction in FIG. 3) including at least an outer peripheral side end of the first recess in the metal member 31. Fourth, the resin layer 90 is formed so as to cover the second recess in the metal member 31. The resin layer 90 is formed also in between these four regions. In other words, the resin layer 90 is formed so as to continuously cover the inner peripheral wall surfaces of the fluid flow path holes 70, the surface facing the stack 20, the part including at least the outer peripheral side end of the first recess, and the second recess in the metal member 31.

In the present embodiment, the resin layer 90 is formed of an insulating polymer material, for example, a polyolefin such as a polypropylene (PP), or an engineering plastic such as a polyamide (PA) and a poly phenylene sulfide (PPS). As a suitable material, an aromatic polyamide or a poly phenylene sulfide (PPS) may be used.

The resin layer 90 can be formed by arranging a die having a shape of the resin layer 90 in the metal member 31 formed with the fluid flow path holes 70, the first recess 81, the second recess 82, and the like and injection molding with a resin material. When the resin layer 90 is formed, molding contradiction of the resin may occur. However, a part of the resin layer 90 enters the second recess 82, and thereby, the resin layer 90 can be prevented from moving at least in the +X direction. Similarly, even when a stress due to difference of coefficients of thermal expansion between the resin layer 90 and the metal member 31 is repeatedly applied to the resin layer 90 as the fuel cell stack 100 is used actually, the resin layer 90 can be prevented from moving in at least the +X direction.

According to the fuel cell stack 100 of the first embodiment described above, the first end plate 30 is formed with the second recess 82 that restricts the resin layer 90 by accommodating a part of the resin layer 90 continuously covering the inner peripheral wall surfaces of the fluid flow path holes 70, the surface in which the first end plate 30 and the stack 20 face to each other, the part including at least the outer peripheral side end of the first recess 81, and the second recess 82, in the metal member 31, and continues to the first recess 81 formed in the outer peripheral surface of the accommodating groove 80. Thus, when a stress due to difference of coefficients of thermal expansion between the resin layer 90 and the metal member 31 is repeatedly applied to the resin layer 90 or when the resin layer 90 attempts to contradict in resin mold forming, the resin layer 90 can be prevented from peeling off from the metal member 31.

B. Second Embodiment

Figure 4:
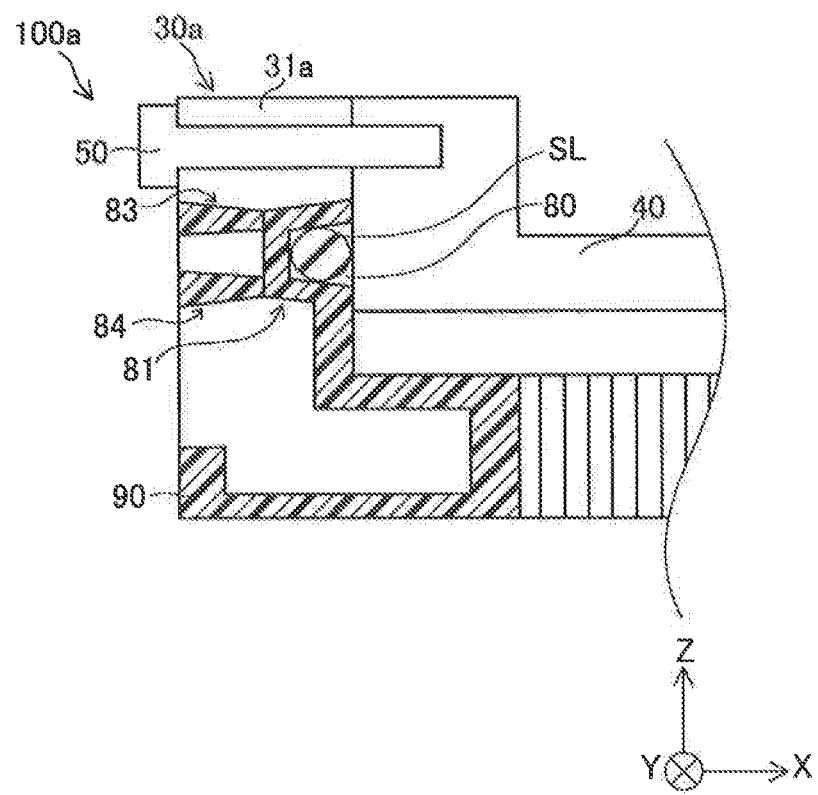
FIG. 4 is an enlarged cross-sectional view showing a configuration of a first end plate in a fuel cell stack as a second embodiment.
Figure 5:
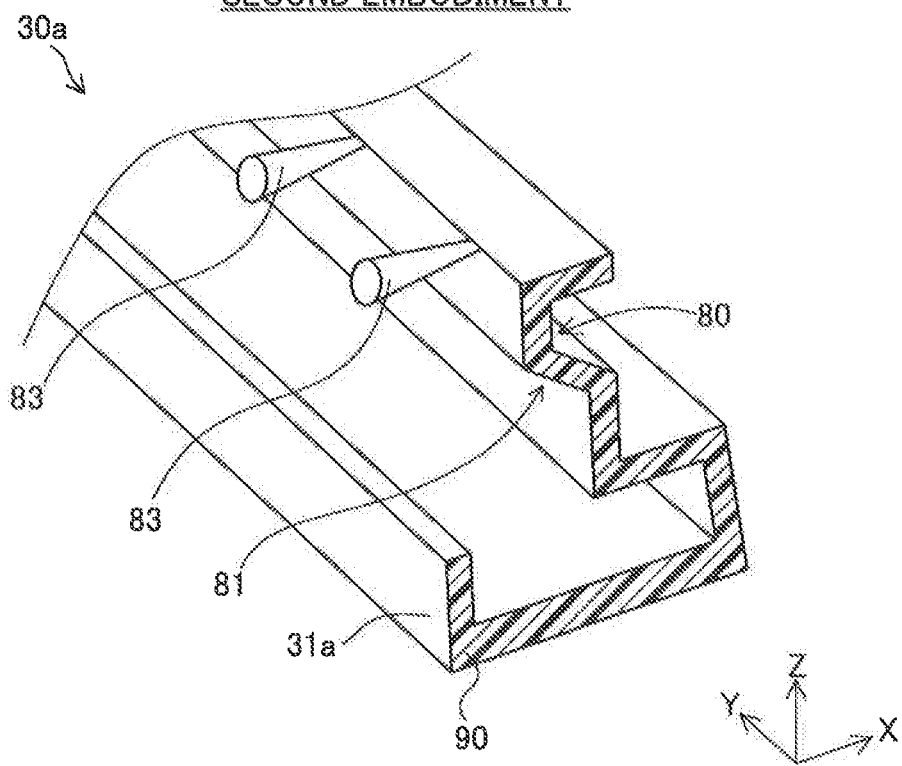
FIG. 5 is an enlarged perspective view further showing the configuration of the first end plate 30a shown in FIG. 4.

FIG. 4 is an enlarged cross-sectional view showing a configuration of a first end plate 30a in a fuel cell stack 100a as a second embodiment. FIG. 5 is an enlarged perspective view showing the configuration of the first end plate 30a shown in FIG. 4. FIG. 4 and FIG. 5 enlarge and show the region including the end in the +Z direction in the first end plate 30a, as similar to FIG. 3. Although not shown, the configuration of the −Z direction side in the first end plate 30a is similar to the configuration of the +Z direction side shown in FIG. 4 and FIG. 5. In FIG. 5, for convenience of description, some components (fourth recess 84 described later and the like) of the first end plate 30a are not shown. The fuel cell stack 100a of the second embodiment is different from the fuel cell stack 100 of the first embodiment in including the first end plate 30a instead of the first end plate 30 and including a metal member 31a instead of the metal member 31. Other configurations in the fuel cell stack 100a of the second embodiment is the same as the fuel cell stack 100 of the first embodiment. Thus, the same component is added with the same reference numeral and the detailed description thereof is omitted.

The first end plate 30a of the second embodiment is different from the first end plate 30 of the first embodiment in a feature that the metal member 31a includes a plurality of third recesses 83 and a plurality of fourth recesses 84. In the second embodiment, the third recess 83 and the fourth recess 84 correspond to the second recess in the disclosure.

As shown in FIG. 4, the third recess 83 is formed to be substantially parallel with the X-axis from the outer peripheral surface of the end in the +Z direction and the −X direction of the first recess 81 toward the end surface of the −X direction side of the metal member 31a. The fourth recess 84 is formed to be substantially parallel with the X-axis from the outer peripheral surface of the end in the −Z direction and the −X direction of the first recess 81 to the end surface of the −X direction side of the metal member 31a. As shown in FIG. 5, the plurality of third recesses 83 are formed side by side with predetermined intervals along the Y-axis. In FIG. 5, the plurality of fourth recesses 84 are not shown. However, the plurality of fourth recesses 84 are formed side by side with predetermined intervals along the Y-axis as similar to the plurality of third recesses 83. The shapes of the third recess 83 and the fourth recess 84 in a plan view (shapes when viewed in the +X direction) are circles. As shown in FIG. 4, the third recess 83 and the fourth recess 84 are formed to be tapered shapes of which cross-section areas that are parallel with the Y-Z plain surface increase toward the −X direction. Therefore, even when the resin attempts to contradict after the resin enters the third recess 83 and the fourth recess 84 in forming of the resin layer 90, the resin (resin layer 90) is prevented from moving in at least the +X direction. Even when a stress due to difference of coefficients of thermal expansion between the resin layer 90 and the metal member 31 is repeatedly applied to the resin layer 90 as the fuel cell stack 100a is actually used after the resin layer 90 is formed, a part of the resin layer 90 enters the third recess 83 and the fourth recess 84, and thereby, the resin layer 90 can be prevented from moving in at least the +X direction. The first end plate 30a having such configuration is manufactured by molding of a metal (aluminum) and a resin by using a die.

Figure 6:
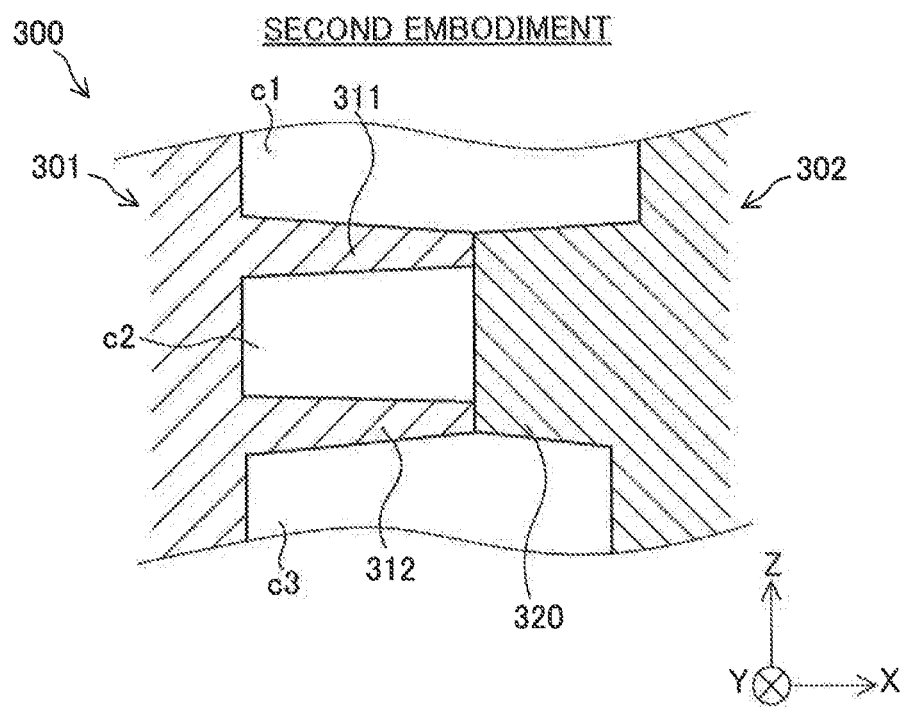
FIG. 6 is an explanatory diagram showing an example of an aluminum molding die.

FIG. 6 is an explanatory diagram showing an example of an aluminum molding die 300. The aluminum molding die 300 is used to mold a base material (hereinafter, referred to as "aluminum semi-molding body") of the metal member 31a of the first end plate 30a. FIG. 6 enlarges and shows a part corresponding to a part near the first recess 81, the third recess 83, and the fourth recess 84 in the first end plate 30a. As shown in FIG. 6, the aluminum molding die 300 includes a lower die 301 and an upper die 302. The lower die 301 includes protrusions 311, 312. The protrusions 311, 312 are formed to be shapes corresponding to the shapes of the third recess 83 and the fourth recess 84, that is, taper shapes of which cross-sectional areas that are parallel with a Y-Z plain surface increase toward the −X direction. The upper die 302 includes a protrusion 320. The protrusion 320 has a shape corresponding to the shape of the first recess 81 and is formed to be one size larger than that of the first recess 81.

The aluminum semi-molding body (aluminum semi-molding body a1 described later) is formed in a process described below. As shown in FIG. 6, the end surface in the +X direction of the protrusions 311, 312 of the lower die 301 and the end surface in the −X direction of the protrusion 320 of the upper die 302 are arranged to face and contact to each other and are clamped with a predetermined clamping pressure. At this time, air gaps c1, c2, and c3 are formed in the aluminum molding die 300. Aluminum is flown into the air gaps c1, c2, and c3. Then, after the aluminum is cooled for a predetermined time, an aluminum semi-molding body (aluminum semi-molding body a1 described later) of which shape is substantially the same as that of the air gaps c1, c2, and c3.

Figure 7:
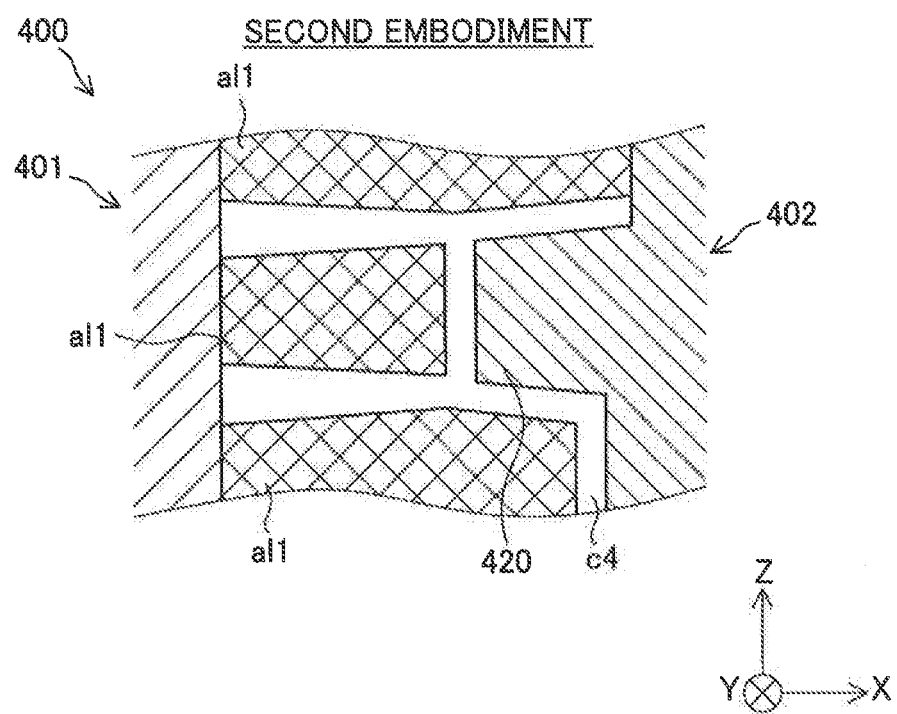
FIG. 7 is an explanatory diagram showing an example of a resin molding die.

FIG. 7 is an explanatory diagram showing an example of a resin molding die 400. Similar to FIG. 6, FIG. 7 enlarges and shows parts corresponding to parts near the first recess 81, the third recess 83, and the fourth recess 84 in the first end plate 30a. The resin molding die 400 is used in forming of the resin layer 90 in contact with the aluminum semi-molding body described above. FIG. 7 shows a state where the resin molding die 400 is arranged with respect to the aluminum semi-molding body a1. The resin molding die 400 includes a lower die 401 and an upper die 402.

The lower die 401 is arranged in contact with the end surface in the −X direction of the aluminum semi-molding body a1, while the upper die 402 is arranged in contact with the end surface in the +X direction of the aluminum semi-molding body a1. The upper die 402 includes the protrusion 420. The protrusion 420 has a shape corresponding to that of the first recess 81 and is formed to have a size that is substantially the same as that of the first recess 81. In a state where the upper die 402 is arranged in a scheduled position, the protrusion 420 does not contact with the aluminum semi-molding body a1 and a gap is formed between the protrusion 420 and the aluminum semi-molding body a1.

The resin layer 90 is formed in the process described below. As shown in FIG. 7, the end surface in the −X direction of the aluminum semi-molding body a1 and the end surface in the +X direction of the lower die 401 are arranged so as to face and-contact to each other. The end surface in the +X direction of the aluminum semi-molding body a1 and the end surface in the −X direction of the upper die 402 are arranged so as to face and contact to each other. At this time, in the resin molding die 400, a surface in which the end surface in the +X direction of the aluminum semi-molding body a1 and the end surface in the −X direction of the protrusion 420 face to each other is formed, and, in parts corresponding to the protrusions 311, 312 of the lower die 301 of the aluminum molding die 300, an air gap c4 is formed. The shape of the air gap c4 is substantially the same as that of the resin layer 90. A resin member is flown into the air gap c4 and the resin layer 90 is formed.

The fuel cell stack 100a of the second embodiment having the configuration described above has a similar effect to that of the fuel cell stack 100 of the first embodiment. That is, when a stress due to difference of coefficients of thermal expansion between the resin layer 90 and the metal member 31 is repeatedly applied to the resin layer 90 and when the resin layer 90 attempts to contradict in resin mold forming, the resin layer 90 can be prevented from moving in at least the +X direction and the resin layer 90 can be prevented from peeling off from the metal member 31a. Since, when the first recess 81, the third recess 83, and the fourth recess 84 are formed, there is no need to perform cutting, the manufacturing cost can be reduced. Since a part of the first recess 81 can be prevented from being cut by accident in cutting, the sealing property by the seal member SL can be prevented from decreasing.

C. Third Embodiment

Figure 8:
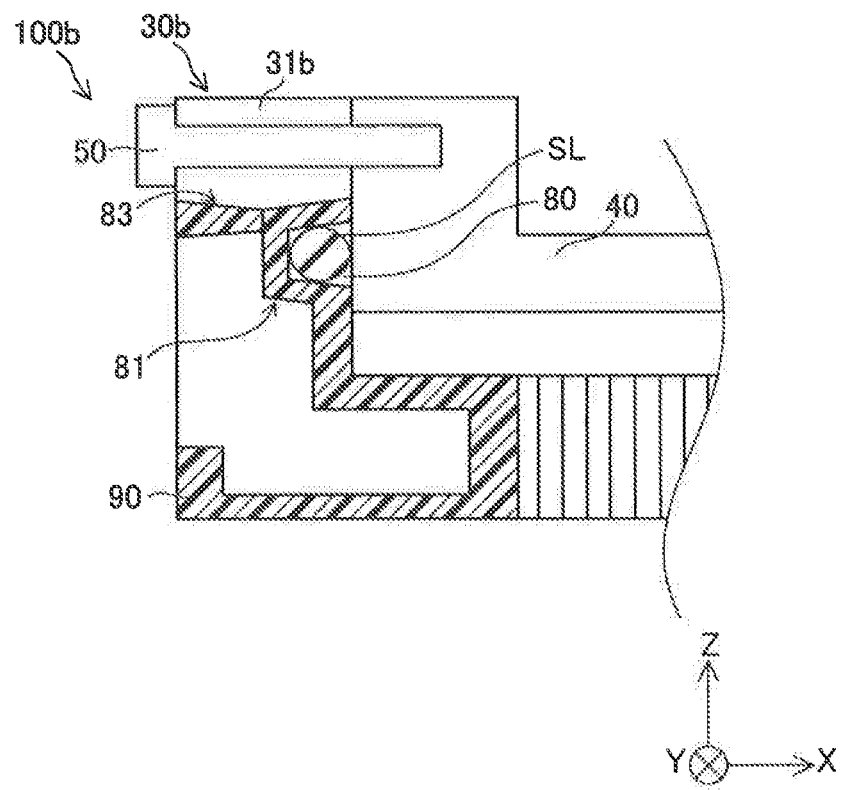
FIG. 8 is an enlarged cross-sectional view showing a configuration of a first end plate in a fuel cell stack as a third embodiment.

FIG. 8 is an enlarged cross-sectional view showing a configuration of a first end plate 30b in a fuel cell stack 100b as a third embodiment.

Similar to FIG. 4, FIG. 8 enlarges and shows a region including an end of the +Z direction in the first end plate 30b. Although not shown, a configuration of the −Z direction side in the first end plate 30b is similar to the configuration of the +Z direction side shown in FIG. 8. The fuel cell stack 100b of the third embodiment is different from the fuel cell stack 100a of the second embodiment in including the first end plate 30b instead of the first end plate 30a and including the metal member 31b instead of the metal member 31a. Other configurations in the fuel cell stack 100b of the third embodiment are the same as those of the fuel cell stack 100a of the second embodiment. Thus, the same component is added with the same reference numeral and the detailed description thereof is omitted.

The first end plate 30b of the third embodiment is different from the first end plate 30a of the second embodiment in a feature that the plurality of fourth recesses 84 in the metal member 31b are omitted. In the third embodiment, the third recess 83 corresponds to the second recess in the disclosure.

The fuel cell stack 100b of the third embodiment having the configuration above has a similar effect to the fuel cell stack 100a of the second embodiment. Since there is no need to form the plurality of fourth recesses 84 in the metal member 31b, the manufacturing cost can be reduced.

D. Fourth Embodiment

FIG. 9 is an enlarged cross-sectional view showing a configuration of a first end plate 30c in a fuel cell stack 100c as a fourth embodiment. Similar to FIG. 4, FIG. 9 enlarges and shows a region including an end of the +Z direction in the first end plate 30c. Although not shown, a configuration of the −Z direction side in the first end plate 30c is similar to the configuration of the +Z direction side shown in FIG. 9. The fuel cell stack 100c of the fourth embodiment is different from the fuel cell stack 100a of the second embodiment in a feature of including the first end plate 30c instead of the first end plate 30a and including a metal member 31c instead of the metal member 31a. Other configurations in the fuel cell stack 100c of the fourth embodiment are the same as those of the fuel cell stack 100a of the second embodiment. Thus the same component is added with the same reference numeral and the detailed description thereof is omitted.

The first end plate 30c of the fourth embodiment is different from the first end plate 30a of the second embodiment in a feature that the plurality of third recesses 83 in the metal member 31c are omitted. In the fourth embodiment, the fourth recess 84 corresponds to the second recess in the means for solving the problem.

The fuel cell stack 100c of the fourth embodiment having the configuration above has a similar effect to the fuel cell stack 100a of the second embodiment. Since there is no need to form the plurality of third recesses 83 in the metal member 31c, the manufacturing cost can be reduced.

E. Modification

E1. Modification 1:

In the embodiments descried above, the fluid flow path holes 70 of which the inner peripheral wall surfaces are covered by the resin layer 90 are flow paths of the cooling medium. Instead of the flow paths, or in addition to the flow paths, inner peripheral wall surfaces of the flow paths of the reactant gas and the off-gas may be covered by the resin layer 90. In such configuration, a similar effect to that of the embodiments described above is exhibited.

E2. Modification 2:

In the second embodiment to the fourth embodiment described above, the third recess 83 and the fourth recess 84 continue to the first recess 81. However, the third recess 83, the fourth recess 84, and the first recess 81 may be configured to connect via a column (hereinafter, referred to as "column part") having the X-axis direction as the axis direction. In this case, the lengths in the Z direction of the end in the +X direction of the third recess 83 and the fourth recess 84 are set larger than the length in the Z direction of the end in the −X direction in the column part to form steps between the third recess 83 and the fourth recess 84, and the column part. The steps formed between the third recess 83 and the fourth recess 84, and the column part can prevent the resin layer 90 from moving in at least the +X direction. In this configuration, the third recess 83 and the fourth recess 84 may be the column. Even in such configuration, a similar effect to that in the second embodiment to the fourth embodiment can be exhibited.

E3. Modification 3:

In the second embodiment to the fourth embodiment described above, the shapes of the third recess 83 and the fourth recess 84 in a plan view (shapes when viewed in the +X direction) are circles. However, the shapes may be, for example, any other shape such as a rectangular shape and a polygon, instead of circle. The third recess 83 and the fourth recess 84 are formed to be a tapered shape of which cross-sectional area that is parallel with the Y-Z plain surface increases toward the −X direction. However, the third recess 83 and the fourth recess 84 may be formed so that the cross-sectional area that is parallel with the Y-Z plain surface is a rectangular shape. Even in these configurations, a similar effect to that of the second embodiment to the fourth embodiment is exhibited.

The present disclosure is not limited to the embodiments and modifications described above and can be performed in various configurations in a range within the spirit of the disclosure. For example, the technical features in the embodiments and the modifications can be replaced or combined as appropriate in order to solve a part or all of the problems described above or achieve a part or all of the effects described above. If the technical features are not described as essentials in the present specification, the features can be deleted as appropriate. For example, the present disclosure may be performed according to the aspects described below.

According to one aspect of the present disclosure, a fuel cell stack is provided. The fuel cell stack includes: a stack that includes a plurality of stacked unit cells; a case that accommodates the stack; and an end plate that is arranged in the outside of a stacking direction of the plurality of unit cells with respect to the stack and is formed with fluid flow path holes penetrating in the stacking direction and an accommodating groove accommodating a seal member for sealing a part between the accommodating groove and the case. The end plates cover an end surface in the stacking direction of the stack and an end surface in the stacking direction of the case and are fastened to an end surface of the case. The end plates have a metal member formed with the fluid flow path holes, a first recess and a second recess that continues to the first recess, and a resin layer that continuously covers an inner peripheral wall surfaces of the fluid flow path holes, a surface that faces the stack, a part that includes at least an outer peripheral side end in the first recess, and the second recess, in the metal member. The resin layer is formed with the accommodating groove in a surface corresponding to the end surface of the case in a part covering the part that includes at least the outer peripheral side end in the first recess. The second recess accommodates a part of the resin layer to restrict the resin layer.

According to the fuel cell stack of this aspect, in the end plate, the second recess that restricts the resin layer by accommodating a part of the resin layer continuously covering the inner peripheral wall surfaces of the fluid flow path holes, the surface in which the end plates and the stack face to each other, the part that includes at least an outer peripheral side end in the first recess, and the second recess, in the metal member, continues to the first recess. Thus, in the end plate, when a stress due to difference of coefficients of thermal expansion between the resin layer and the metal member is repeatedly applied to the resin layer and when the resin layer attempts to contradict in resin mold forming, the resin layer can be prevented from peeling off from the metal member.

In the fuel cell stack of the aspect, the second recess has a third recess that is arranged along the stacking direction and continues to a part in an opposite side from the accommodating groove, along the stacking direction in the outer peripheral side end of the first recess. At least a part of the third recess along the stacking direction may be formed to be a tapered shape of which cross-sectional area that is orthogonal to the stacking direction gradually increases from the stack along the stacking direction toward the end plate.

In the fuel cell stack of the aspect described above, the overall along the stacking direction of the third recess may be formed to be the tapered shape.

In the fuel cell stack of the aspect described above, the second recess has a fourth recess that is arranged along the stacking direction and continues to a part in an opposite side from the accommodating groove, along the stacking direction in the inner peripheral side end of the first recess. At least a part of the fourth recess along the stacking direction may be formed to be a tapered shape of which cross-sectional area that is orthogonal to the stacking direction gradually increases from the stack along the stacking direction toward the end plate.

In the fuel cell stack of the aspect t described above, the overall along the stacking direction of the fourth recess may be formed to be the tapered shape.

In the fuel cell stack of the aspect t described above, the second recess has a third recess and a fourth recess. The third recess is arranged along the stacking direction and continues to a part in an opposite side from the accommodating groove, along the stacking direction in the outer peripheral side end of the first recess. The overall along the stacking direction of the third recess is formed to be a tapered shape of which cross-sectional area that is orthogonal to the stacking direction gradually increases from the stack along the stacking direction toward the end plates. The fourth recess is arranged along the stacking direction and continues to a part in the opposite side from the accommodating groove, along the stacking direction in the inner peripheral side end of the first recess. The overall along the stacking direction of the fourth recess is formed to be the tapered shape.

The present invention can be performed in various embodiments and aspects. For example, the present disclosure can be performed in an embodiment such as a fuel cell system including a fuel cell stack, and a vehicle including the fuel cell system.

What is claimed is:

1. A fuel cell stack comprising:
a stack that includes a plurality of stacked unit cells;
a case that accommodates the stack; and
an end plate that is arranged in the outside of a stacking direction of the plurality of unit cells with respect to the stack and is formed with fluid flow path holes penetrating in the stacking direction and an accommodating groove accommodating a seal member for sealing a part between the accommodating groove and the case, wherein
the end plates covering an end surface in the stacking direction of the stack and an end surface in the stacking direction of the case and fastened to the end surface of the case,
the end plates having
a metal member formed with the fluid flow path holes, a first recess and a second recess that continues to the first recess, and
a resin layer that continuously covers an inner peripheral wall surface of the fluid flow path holes, a surface that faces the stack, a part that includes at least an outer peripheral side end in the first recess, and the second recess, in the metal member, the resin layer being formed with the accommodating groove in a surface corresponding to the end surface of the case in a part covering the part that includes at least the outer peripheral side end in the first recess, and
the second recess accommodating a part of the resin layer to restrict the resin layer.

2. The fuel cell stack in according to claim 1, wherein
the second recess has a third recess that is arranged along the stacking direction and continues to a part in an opposite side from the accommodating groove, along the stacking direction in the outer peripheral side end of the first recess, and
at least a part of the third recess along the stacking direction is formed to be a tapered shape of which cross-sectional area that is orthogonal to the stacking direction gradually increases from the stack along the stacking direction toward the end plates.

3. The fuel cell stack in according to claim 2, wherein
the overall along the stacking direction of the third recess is formed to be the tapered shape.

4. The fuel cell stack in according to claim 1, wherein
the second recess has a fourth recess that is arranged along the stacking direction and continues to a part in an opposite side from the accommodating groove, along the stacking direction in the inner peripheral side end of the first recess, and
at least a part of the fourth recess along the stacking direction is formed to be a tapered shape of which cross-sectional area that is orthogonal to the stacking direction gradually increases from the stack along the stacking direction toward the end plates.

5. The fuel cell stack in according to claim 4, wherein
the overall along the stacking direction of the fourth recess is formed to be the tapered shape.

6. The fuel cell stack in according to claim 1, wherein
the second recess has a third recess and a fourth recess,
the third recess is arranged along the stacking direction and continues to a part in an opposite side from the accommodating groove, along the stacking direction in the outer peripheral side end of the first recess,
the overall along the stacking direction of the third recess is formed to be a tapered shape of which cross-sectional area that is orthogonal to the stacking direction gradually increases from the stack along the stacking direction toward the end plates,
the fourth recess is arranged along the stacking direction and continues to a part in the opposite side from the accommodating groove, along the stacking direction in the inner peripheral side end of the first recess, and
the overall along the stacking direction of the fourth recess is formed to be the tapered shape.

* * * * *